0
United States Patent Office 3,350,383
Patented Oct. 31, 1967

3,350,383
TETRAKISAZO DYES
Charles L. Conway, Lock Haven, Pa., assignor to American Aniline Products, Inc., a corporation of Delaware
No Drawing. Filed Nov. 3, 1964, Ser. No. 408,666
5 Claims. (Cl. 260—166)

This invention relates to tetrakisazo dyes. In one specific aspect it relates to tetrakisazo dyes, made using resorcinol as a coupling component, which are remarkably useful for coloring rigid and non-rigid plastics and which are also suitable for coloring petroleum hydrocarbons.

Disazo and trisazo derivatives of resorcinol are not new. Orndorff and Ray in the "American Chemical Journal," volume 44 (1910), report disazo derivatives made by coupling two moles of diazotized o- or p-toluidine into resorcinol and three moles of diazotized o-toluidine into resorcinol to give the 2,4,6-triazo-substituted derivative. The compounds of Orndorff and Ray have never been commercially useful. These compounds lack the depth of shade and the solubility characteristics to make them useful as good plastic colors or as oil colors.

I have discovered a new class of tetrakisazo dyes made from resorcinol which are unexpectedly good plastic colors and are characterized by remarkable lightfastness. The structural configuration of my new colors appears to greatly enhance the depth of shade which can be achieved.

It is therefore an object of the invention to provide a new class of tetrakisazo dye which are particularly useful as colorants for rigid and non-rigid plastics because of their good solubility in plastics and excellent lightfastness, and which are also useful as oil colors.

In accordance with the invention I have discovered new dyes of the formula:

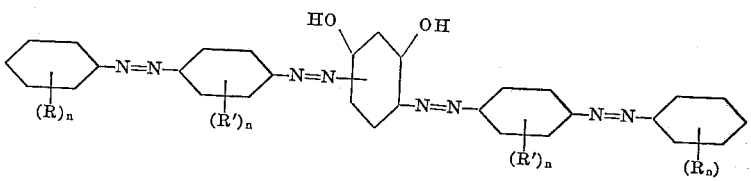

In the above formula $n$ is an integer having a value of 1–2. R is a member selected from the group consisting of hydrogen and alkyl radicals having from 1–4 carbon atoms, at least one R on each benzene ring being an alkyl radical having from 1–4 carbon atoms. R' is a member selected from the group consisting of hydrogen, methoxy, and alkyl radicals having from 1–4 carbon atoms, at least one R' being a substituent other than hydrogen.

The dyes of the invention are made by the conventional diazotization of simple aminoazo intermediates and the coupling of two moles of the diazotized aminoazo intermediate, or one mole of each of two different diazotized aminoazo intermediates, into resorcinol.

Particularly useful intermediates can be made by the diazotization of mixtures of simple aminobenzenes substituted by appropriate lower alkyl or methoxy groups. Thus, the aminoazo intermediate can be prepared by the diazotization of mixed xylidines, mixed toluidines, or a mixture of mixed xylidines and mixed toluidines. Effective intermediates are also prepared using the corresponding ethyl, propyl, or butyl arylamines. Intermediates containing methoxy groups can be prepared, for example, by diazotizing mixed xylidines and coupling into anisidine. In lieu of the isomeric mixtures, pure o-, m- and p-xylidines or toluidines can be used.

The aminoazo intermediate is diazotized in the usual way by heating it in a concentrated solution of a strong mineral acid, such as hydrochloric acid, cooling the mixture to a temperature of 0–10° C. and adding thereto a quantity of sodium nitrite slightly in excess of the stoichiometric requirement. An alternate method of diazotization involves dissolving sodium nitrite in concentrated sulfuric acid by heating at a temperature of about 60–70° C., cooling the resulting solution to 0–10° C. and adding thereto the aminoazo intermediate.

The tetrakisazo dyestuff of the invention is made by coupling two moles of the diazotized aminoazo intermediate, or one mole of each of two diazotized aminoazo intermediates, with resorcinol by adding the diazonium salt solution to a cold aqueous alkaline solution of resorcinol. The mixture is allowed to react for several hours at room temperature and is thereafter filtered and washed alkali free. The resulting product is oven dried to give the dyestuff of the invention in the form of a dried powder.

The dyes of the invention are useful in the coloration of plastics derived from vinyl monomers, particularly poly-α-olefins; e.g., polyethylene; polyacrylates; e.g., polymethylenemethacrylate and polyacrylonitrile; copolymers of styrene and butadiene; and polymers of vinylaryl monomers; e.g., polystyrenes; styrene and α-methylstyrene, and the like. The dyes can be easily applied by dissolving from 0.05–5 percent by weight of the isomer prior to polymerization, or alternatively, by dissolving the dye in the molten plastic.

The dyes are also useful as colorants for petroleum hydrocarbons, particularly gasoline.

My invention is further illustrated by the following examples:

*Example I*

To a one-liter beaker equipped with agitator there was charged 44 g. (0.2 mole) of an Oil Red Base (prepared by diazotizing and coupling a mixture of 90 mole percent o-toluidine and 10 mole percent mixed xylidines), 300 g. water and 60 g. of 20° Baumé hydrochloric acid. The mixture was stirred for 12 hours at 25–30° C. and then iced to 0° C. At 0–10° C. there was added 14.1 g. of sodium nitrite as a 20 percent solution. The reaction mixture was maintained at 0–10° C. for three hours, during which time it was tested for acidity to Congo Red and for the presence of an excess of nitrous acid.

To a two-liter beaker equipped with agitator there was separately charged 11 g. resorcinol (0.1 mole), 200 g. water, 80 g. sodium hydroxide (100 percent), and 28 g. sodium carbonate. The resulting coupling solution was iced to 0° C. and the separately prepared diazonium solution was added thereto. The mixture was stirred overnight at 20–25° C. then filtered and washed alkaline free to Brilliant Yellow paper with cold water. The product was dried in an oven at 80–90° C. to give 52.4 g. of pure color.

*Example II*

A 200 mg. quantity of the dye of Example I and 200 g. methylmethacrylate molding powder were run over a Thropp mill for 15–20 minutes at a temperature of 145–160° C. to incorporate the color. The colored plastic was taken off of the mill and pressed into a bright red disk.

*Example III*

To a one-liter beaker equipped with agitator there was charged 51.0 g. (0.2 mole) of an Oil Red Base (prepared by diazotizing and coupling o-ethylaniline), 300 g. water and 60.0 g. of 20° Baumé hydrochloric acid. The mixture was stirred for 12 hours at 25–30° C. and then iced to 0° C. At 0–10° C. there was added 14.1 g. of sodium nitrite as a 20 percent solution. The reaction mixture was maintained at 0–10° C. for three hours, during which time it was tested for acidity to Congo Red and for the presence of an excess of nitrous acid.

To a two-liter beaker equipped with agitator there was separately charged 11 g. resorcinol (0.1 mole), 200 g. water, 80 g. sodium hydroxide (100 percent), and 28 g. sodium carbonate. The resulting coupling solution was iced to 0° C. and the separately prepared diazonium solution was added thereto. The mixture was stirred overnight at 20–25° C. then filtered and washed alkaline free to Brilliant Yellow paper with cold water. The product was dried in an oven at 80–90° C. to give 64.0 g. of pure color.

Example IV

To a one-liter beaker equipped with agitator there was charged 51.4 g. (0.2 mole) of an Oil Red Base (prepared by diazotizing and coupling 50 mole percent mixed xylidines and 50 mole percent o-anisidine), 300 g. water and 60.0 g. of 20° Baumé hydrochloric acid. The mixture was stirred for 12 hours at 25–30° C. and then iced to 0° C. At 0–10° C. there was added 14.1 g. of sodium nitrite as a 20 percent solution. The reaction mixture was maintained at 0–10° C. for three hours, during which time it was tested for acidity to Congo Red and for the presence of an excess of nitrous acid.

To a two-liter beaker equipped with agitator there was separately charged 11 g. resorcinol (0.1 mole), 200 g. water, 80 g. sodium hydroxide (100 percent), and 28 g. sodium carbonate. The resulting coupling solution was iced to O° C. and the separately prepared diazonium solution was added thereto. The mixture was stirred overnight at 20–25° C. then filtered and washed alkaline free to Brilliant Yellow paper with cold water. The product was dried in an oven at 80°–90° C. to give 63.0 g. of pure color.

Example V

To a one-liter beaker equipped with agitator there was charged 51.2 g. (0.2 mole) of an Oil Red Base (prepared by diazotizing and coupling 50 mole percent o-ethylaniline and 50 mole percent o-anisidine), 300 g. water and 60 g. of 20° Baumé hydrochloric acid. The mixture was stirred for 12 hours at 25–30° C. and then iced to 0° C. At 0–10° C. there was added 14.1 g. of sodium nitrite as a 20 percent solution. The reaction mixture was maintained at 0–10° C. for three hours, during which time it was tested for acidity to Congo Red and for the presence of an excess of nitrous acid.

To a two-liter beaker equipped with agitator there was separately charged 11 g. resorcinol (0.1 mole), 200 g. water, 80 g. sodium hydroxide (100 percent), and 28 g. sodium carbonate. The resulting coupling solution was iced to 0° C. and the separately prepared diazonium solution was added thereto. The mixture was stirred overnight at 20–25° C. then filtered and washed alkaline free to Brilliant Yellow paper with cold water. The product was dried in an oven at 80–90° C. to give 64.0 g. of pure color.

The dyes of Examples III, IV and V, when tested in methyl methacrylate molding powder, give results substantially similar to that of Example II.

I claim:

1. A compound of the formula:

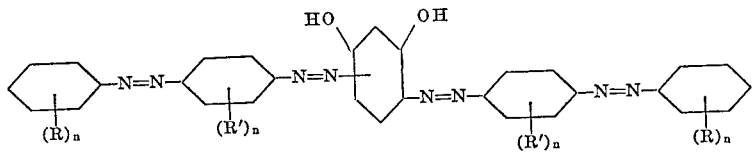

wherein $n$ is an integer having a value of 1–2; R is a member selected from the group consisting of hydrogen and alkyl radicals having from 1–4 carbon atoms, at least one R on each benzene ring being an alkyl radical having from 1–4 carbon atoms; and R' is a member selected from the group consisting of hydrogen, methoxy and alkyl radicals having from 1–4 carbon atoms, at least one R' being a substituent other than hydrogen.

2.

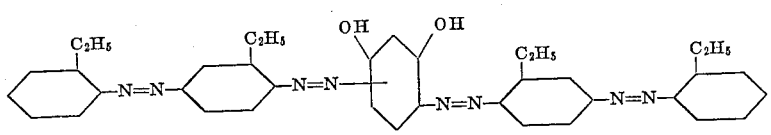

3.

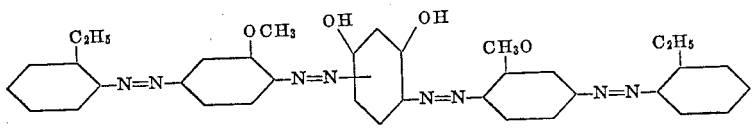

4.

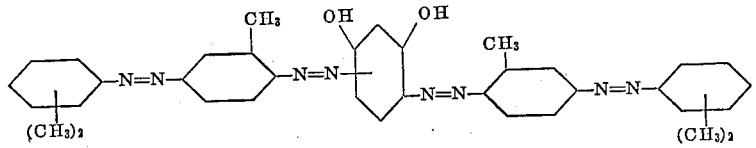

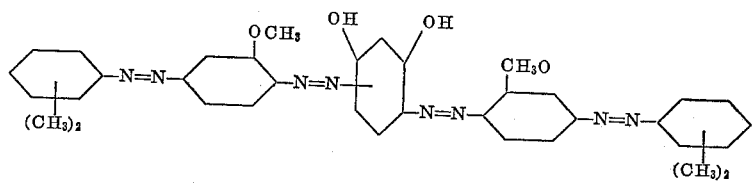
References Cited
UNITED STATES PATENTS
2,535,416  12/1950  Hindermann et al. ____ 260—166
CHARLES B. PARKER, *Primary Examiner.*
DONALD M. PAPUGA, *Assistant Examiner.*